United States Patent [19]

Sdano

[11] Patent Number: 5,131,621
[45] Date of Patent: Jul. 21, 1992

[54] UNIVERSAL HOLD-DOWN ASSEMBLY FOR PUMP ASSEMBLIES AND THE LIKE

[75] Inventor: Arnold R. Sdano, Elkhart, Ind.

[73] Assignee: American Gage and Machine Company, Elgin, Ill.

[21] Appl. No.: 716,897

[22] Filed: Jun. 18, 1991

[51] Int. Cl.⁵ .............................................. F16M 1/00
[52] U.S. Cl. .................................. 248/680; 248/500; 248/677
[58] Field of Search ............... 248/680, 677, 649, 650, 248/542, 499, 503, 503.1, 500; 52/707, 704; 294/89

[56] References Cited

U.S. PATENT DOCUMENTS

| | | | |
|---|---|---|---|
| 2,163,446 | 6/1939 | Heckman | 52/707 X |
| 3,356,324 | 12/1967 | Attermeyer | 248/650 |
| 3,640,328 | 2/1972 | Tummarello | 52/707 X |
| 3,730,463 | 5/1973 | Richard | 248/677 X |
| 4,017,115 | 4/1977 | Holt | 294/89 |
| 4,575,034 | 3/1986 | Tobey | 248/677 |
| 4,690,365 | 9/1987 | Miller | 248/650 |
| 4,930,741 | 6/1990 | Young | 248/542 |

Primary Examiner—J. Franklin Foss
Attorney, Agent, or Firm—Emrich & Dithmar

[57] ABSTRACT

A universally adjustable hold-down assembly for mounting a drive unit relative to a respective driven unit includes a support member for supporting the drive unit adjacent to a mounting hole thereof, a rod having a head portion located within a cavity defined by the support member and a shank portion which extends through a circular aperture in the support member and through the mounting hole, and a retaining nut which secures the drive unit to the support member, the rod shank portion being sized to be displaceable relative to the centerline of the aperture and the rod head portion being sized to prevent its passing through the aperture.

12 Claims, 1 Drawing Sheet

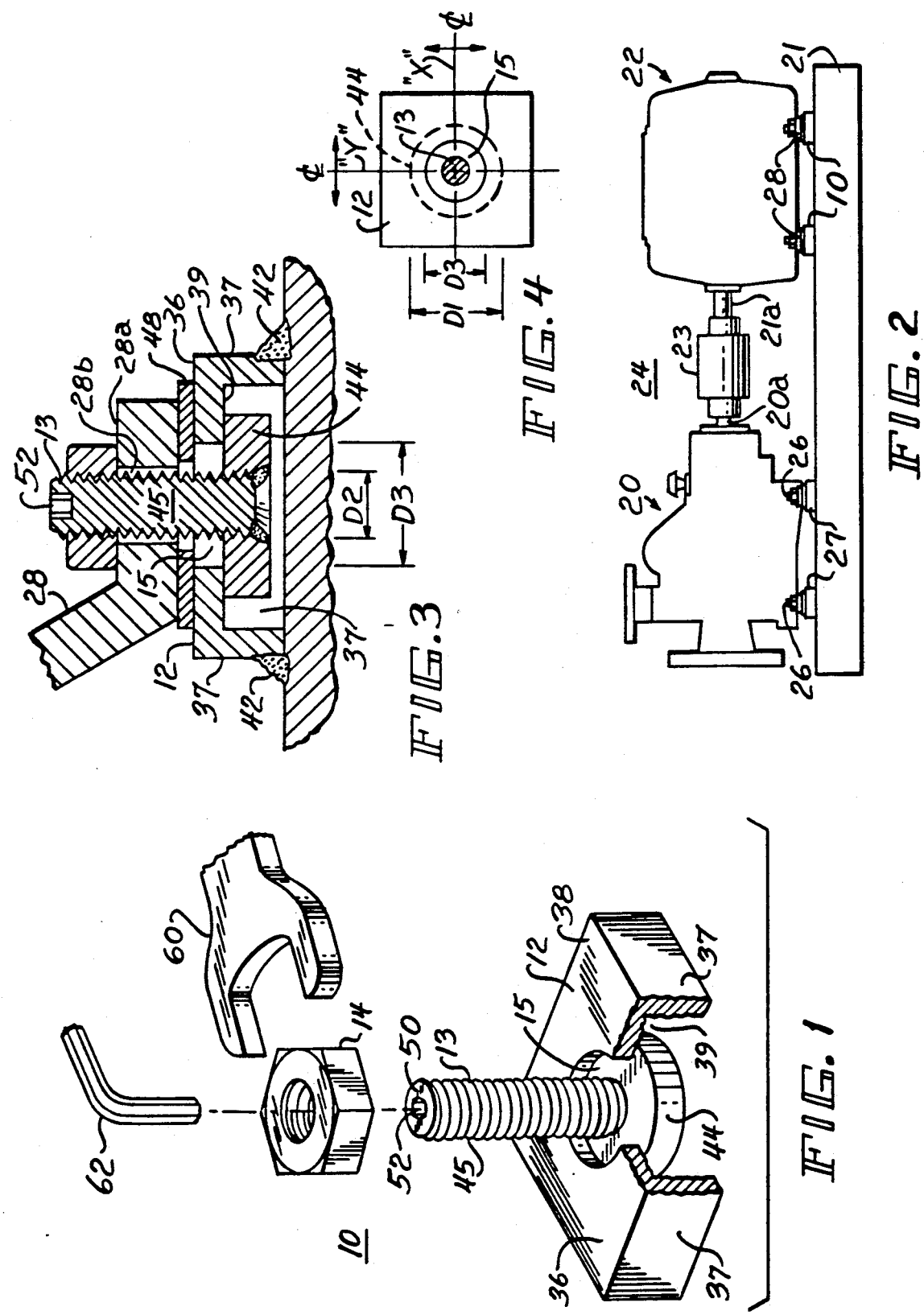

UNIVERSAL HOLD-DOWN ASSEMBLY FOR PUMP ASSEMBLIES AND THE LIKE

BACKGROUND OF THE INVENTION

This invention relates to a universally adjustable hold-down assembly for mounting apparatus on a support frame, and more particularly for mounting any drive unit in alignment with its respective driven equipment.

Pump assembly installations frequently include a separate pump unit and an associated drive unit for driving the pump unit. The pump unit and the drive unit are provided with casing feet or the like having a plurality of mounting holes to facilitate mounting of the pump unit and the drive unit on a common support frame. Typically, the pump unit and the drive unit are attached to the support frame by bolts which pas through the mounting holes and through holes in the support frame. For proper operating of the pump assembly, it is essential that the shaft of the pump be aligned coaxially with the shaft of the drive unit. Thus, some latitude is required in the design of the pump unit and driver mounts to accommodate pump units and drive units having different mounting centers. For example, slots may be provided in the mounting feet of the pump unit and/or the driver. Although such arrangement provides limited relative adjustment between the pump unit and the driver during installation the amount of relative movement provided may not be sufficient to allow the shafts to be aligned coaxially. Also, because only limited adjustment is provided, considerable time may be required to rework components to avoid bolt binding. This is particularly true for the case where the pump unit and/or the driver are replaced with a different unit, in which case the center lines for the mounting holes for the replacement pump unit or drive unit may not match those for the original unit being replaced.

SUMMARY OF THE INVENTION

It is an object of the present invention to provide an improved mounting arrangement for mounting apparatus on a support surface, and in particular, apparatus including a drive unit and a driven unit having shafts which must be aligned coaxially.

Another object of the invention is to provide a universally adjustable hold-down assembly for use in mounting apparatus on a supporting frame or the like wherein the mount is adjustable to be displaceable in a horizontal plane over a range of 0° to 360°.

These and other objects are achieved by the present invention which provides a universally adjustable hold-down assembly for use in mounting apparatus on a supporting surface wherein the apparatus has a mounting portion including a plurality of mounting holes to facilitate mounting on a supporting surface. The hold-down assembly comprises a support member for supporting the mounting portion of the apparatus adjacent to one of the mounting holes in the mounting portion. The support member has a generally planar top portion having an inner surface and an outer surface with an aperture through the top portion. The support member includes a supporting portion depending from the top portion and adapted to be secured to the supporting surface, supporting the top portion in a parallel spaced relationship with the supporting surface defining a cavity. The hold-down assembly includes further a rod having first and second ends with a head portion at its first end and a shank portion, the rod being positioned with its shank portion extending through the aperture and the mounting hole and with its head portion located within the cavity engaging the inner surface adjacent to the aperture. A retaining means is received on the shank portion for drawing the head portion into engagement with the inner surface of the top portion thereby securing the mounting support member portion. The size and shape of the aperture enables the rod to be displaceable along radial lines, in a horizontal plane normal to the axis of the rod over a range of 0° to 360°. The size of the head portion relative to the size of the aperture is such that the head portion is maintained in engagement with the inner surface of the top portion over the full extent of travel of the rod.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

For the purpose of facilitating and understanding the invention, there is illustrated in the accompanying drawings a preferred embodiment thereof, from an inspection of which, when considered in connection with the following description, the invention, its construction and operation, and many of its advantages will be readily understood and appreciated.

FIG. 1 is an exploded perspective view of the adjustably hold-down assembly provided by the present invention, with the support member partially cut away;

FIG. 2 is a simplified representation of a pump installation including a pump unit and a drive motor mounted on a common frame, the drive motor being mounted on the frame by the adjustable hold-down assembly provided by the present invention;

FIG. 3 is a side sectional view of the adjustable hold-down assembly shown assembled with the mounting foot of an apparatus which is mounted on a supporting frame; and FIG. 4 is a top plan view of the hold-down and assembly.

DESCRIPTION OF A PREFERRED EMBODIMENT

Referring to FIG. 1, the adjustable hold-down assembly 10 provided by the present invention includes a support member 12, a rod 13, and a retaining device which in the exemplary embodiment is a nut 14. As will be shown, the hold-down assembly 10 is universally adjustable. That is, the rod 13 is movable relative to the support member 12 in all directions relative to the centerline of aperture 15 in the support member, enabling relocation of the mounting centerline defined by rod 13 over a continuous 360° range.

Referring to FIG. 2, the hold-down assembly 10 is described with reference to an application for mounting a pump unit 20 on a frame 21 with a drive unit 22, which may be a motor or a steam turbine, for example. However, the hold-down assembly 10 can be used in virtually any application which requires adjustable mounting of equipment or devices on a supporting surface, and particularly, in applications for mounting equipment or devices having shafts that must be aligned coaxially with one another. More specifically, the pump unit 20 and drive unit 22, embodied as a motor, are mounted on a common frame 21 forming a pump assembly 24. The pump unit 20 has a shaft 20a which is aligned coaxially with and connected to the drive shaft 21a of the motor 22 by way of a coupling device 23. In the exemplary embodiment, the pump 20 is mounted directly to the frame 21 by way of bolts 26 which pass through mounting holes, often threaded to secure the bolts 26, (not shown) of the pump or mounting portion 27. The motor 22 is mounted to the frame 21 by way of a plurality of the universal holddown assemblies 10, two of which are shown in FIG. 2, provided in accordance with the present invention. A separate hold-down assembly 10 is provided for each mounting leg 28 of the drive unit 22. Each mounting leg has a generally planar horizontally extending mounting portion 28a, as shown in FIG. 3, which has a mounting hole 28b therethrough.

Referring to FIGS. 1 and 3, the support member 12 has a top planar surface 36 and side(s) 37 which depends from the top. In the exemplary embodiment, the support member is a generally box-shaped member having four sides 7. However, the support member could be a round cylinder as well. The top 36 has an outer or upper surface 38 and an inner or lower surface 39 with aperture 15 therethrough. Preferably, the aperture is circular in shape. Support member 12 is mounted on the frame 21 and permanently secured or fixed thereto in a suitable way as by welding as indicated at 42 at the lower end of sides 37.

The rod 13 has a head portion 44 which is generally circular in shape and a threaded shank portion 45, of circular cross-section, which receives the retaining nut 14 in threading engagement. The head portion 44 is captured within the box-like structure, defined by the support member 12, and the shank portion 45 projects upwardly through the aperture 15 and through the mounting hole 28b in the mounting portion 28a of the motor 22 (FIG. 3). A shim 48 may be located between the support member 12 and the mounting portion 28a. The rod 13 is displaceable or repositionable horizontally relative to the support member 12 to define an adjustable mounting center for the assembly. The retaining nut 14 is threaded onto the shank portion 45 and tightened down, as shown in FIG. 3, drawing the head portion 44 into contact with the inner surface 39 of the support member 12 to secure the mounting portion 28a of the drive motor 22 to the frame 21. The end 50 of the threaded shank 45 is provided with a hexagonal shaped recess 52 to facilitate tightening of the retaining nut 14, while the nut 14 is being tightened with a wrench 60, an Allen wrench 62 is inserted into the hexagonal head 52 in the shank of rod 13 and held, to prevent rotation of the rod 13 while the nut 14 is tightened down.

Referring to FIGS. 3 and 4, as shown, the outer diameter D1 (FIG. 4) of the circular head portion 44 is about twice the outer diameter D2 (FIG. 3) of the rod shank portion 45, and approximately 1.5 times the diameter D3 of the aperture 15. Thus, the size of the head portion 44 and the shank portion 45 relative to the size of the aperture 15 are such that the head portion is maintained in engagement with the inner surface 39 of the top portion over the full extent of travel or positioning of the rod 13 within the aperture 15. Such a structure provides for universal adjustment of the position of the rod 13 relative to the fixed support member 12. In FIG. 4, the rod 13 is illustrated at a centered position wherein its axis is coaxial with the centerline of the aperture 15.

The rod 13 is displaceable from this position not only along or through axes "X" and "Y", but also along radial lines extending at any angle relative to the axes "X" and "Y". That is, the shape of the aperture enables the rod to be universally displaceable or repositional over a range of 0° to 360° in a horizontal plane.

Thus, in one embodiment of the present invention there is provided an adjustable hold-down assembly which can be used in virtually any application which requires adjustable mounting of equipment or devices on a supporting surface, and particularly, in applications for mounting equipment or devices having shafts that must be aligned coaxially with one another. In one use, for example, one such assembly is provided for each of the mounting legs of a drive unit, as described for the exemplary application, with each assembly providing universal adjustability during mounting and alignment to the pump unit. This not only simplifies the installation of the drive unit 22 on the frame 21 but also assures that the shaft 22a of the drive frame 21 is aligned easily and readily with the shaft 20a of the pump 20.

However, it is within the scope of the present invention that the adjustable mounting and/or hold-down assembly has application for mounting virtually any drive unit and its respective driven equipment and for mounting auxiliary apparatus, such as bearing units, in alignment with such drive unit and/or driven equipment. Moreover, although in an exemplary embodiment, the adjustable mounting and/or hold-down assembly is described with reference to mounting the drive unit, it is within the scope of the present invention that the driven equipment and/or the drive unit and auxiliary apparatus may be mounted by the adjustable hold-down assembly provided by the present invention.

I claim:

1. A universally adjustable hold-down assembly for mounting apparatus on a supporting surface, the apparatus being comprised of a mounting portion having mounting holes therein for mounting on and attachment to the supporting surface, said hold-down assembly comprising:

a support member for supporting the mounting portion of the apparatus adjacent to one of the mounting holes in the mounting portion, said support member having a generally planar top portion and a depending foot portion, said top portion having an inner surface and an outer surface and an aperture therethrough with said outer surface being adapted to receive and hold the mounting portion of the apparatus, said depending foot portion depending from said top portion and being adapted to be fixedly secured to the supporting surface with said depending foot portion supporting said top portion in a parallal spaced relation with said supporting surface to provide a cavity between said inner surface of said top portion and the supporting surface;

a rod including a head portion and a shank portion having first and second ends, said head portion being fixedly attached to said shank portion at its first end, said rod being positioned with its shank portion extending through said aperture and said mounting hole and with its head portion located within said cavity, engaging said inner surface adjacent to said aperture, and retaining means received on said shank portion for drawing said head portion into engagement with said inner surface of said top portion of said support member to secure said mounting portion to said support member, the size and shape of said aperture enabling said rod to be displaceable along radial lines in a horizontal plane normal to its axis over a range of 0° to 360° and the size of the head portion relative to the size of the aperture being such that the head portion is maintained in engagement with said inner surface of said top portion of said support member over the full extent of travel of said rod.

2. The hold-down assembly of claim 1, wherein said shank portion has threads on at least a portion thereof, said retaining means comprising a nut threadably received on said threaded shank portion.

3. The hold-down assembly of claim 2, wherein said second end of said shank portion is adapted to receive a tool for restraining said rod against rotation relative to said nut.

4. The hold-down assembly of claim 1, wherein said aperture is generally circular.

5. The hold-down assembly of claim 5, wherein said head portion is generally circular and the diameter of said head portion is approximately 1.5 times greater than the diameter of said aperture.

6. The hold-down assembly of claim 1, wherein said supporting member is generally box-like in shape, said top portion being generally rectangular in shape and said depending foot portion comprising four sides depending from said top portion.

7. In a system including a first apparatus and a second apparatus each having a shaft, the first apparatus and the second apparatus being mounted on a supporting surface with their respective shafts coupled together said first apparatus and said second apparatus each being comprised of a mounting portion having a plurality of mounting holes therein to facilitate mounting and attachment to the support surface, mounting means associated with at least the first apparatus for mounting and attaching the first apparatus on the supporting surface, said mounting means being universally adjustable in at least one plane to facilitate the alignment of the shaft of the first apparatus coaxially with the shaft of the second apparatus, said mounting means comprising:

a plurality of hold-down assemblies each associated with a different one of the mounting holes of the first apparatus and including a support member for supporting the mounting portion of the first apparatus adjacent to one of the mounting holes of the first apparatus, said support member having a generally planar top portion and a depending foot portion, said top portion having an inner surface and an outer surface and an aperture therethrough with said outer surface being adapted to receive and hold the mounting portion of the first apparatus, said depending foot portion depending from said top portion and being adapted to be secured to the supporting surface with said depending foot portion supporting said top portion in a parallel spaced relation with said supporting surface to provide a cavity between said inner surface of said top portion and the supporting surface, a rod including a head portion and a shank portion having first and second ends. said head portion being fixedly attached to said shank portion at its first end, said rod being positioned with its shank portion extending through said aperture and said mounting hole and with its head portion located within said cavity, engaging said inner surface adjacent to said aperture, and retaining means received on said shank portion for drawing said head portion into engagement with said inner surface of said top portion of said support member securing said mounting portion to said support member, the size and shape of said aperture enabling said rod to be displaceable along radial lines in a horizontal plane normal to its axis over a range of 0° to 360° and the size of the head portion relative to the size of the aperture being such that the head portion is maintained in engagement with said inner surface of said top portion of said support member over the full extent of said travel of said rod.

8. The hold-down assembly of claim 7, wherein said shank portion has threads on at least a portion thereof, said retaining means comprising a nut threadably received on said threaded shank portion.

9. The hold-down assembly of claim 8, wherein said second end of said shank portion is adapted to receive a tool for restraining said rod against rotation relative to said nut.

10. The hold-down assembly of claim 7, wherein said aperture is generally circular.

11. The hold-down assembly of claim 10, wherein said head portion is generally circular and the diameter of said head portion is approximately 1.5 times greater than the diameter of said aperture.

12. The hold-down assembly of claim 7, wherein said supporting member is generally box-like in shape, said top portion being generally rectangular in shape and said depending foot portion comprising four sides depending from said top portion.

* * * * *

UNITED STATES PATENT AND TRADEMARK OFFICE
CERTIFICATE OF CORRECTION

PATENT NO. : 5,131,621
DATED : July 21, 1992
INVENTOR(S) : Arnold R. Sdano It is certified that error appears in the above-identified patent and that said Letters Patent is hereby corrected as shown below:

Column 1, line 18 delete "pas" and insert -- pass --.

Column 3, line 23 delete "having four sides 7" and insert -- having four sides 37 --.

Column 4, line 20 delete "of the drive frame 21" and insert -- of the drive unit 22 --.

Signed and Sealed this

Seventeenth Day of August, 1993

*Attest:*

BRUCE LEHMAN

*Attesting Officer*     *Commissioner of Patents and Trademarks*